US010282775B1

United States Patent
Guez et al.

(10) Patent No.: US 10,282,775 B1
(45) Date of Patent: May 7, 2019

(54) SYSTEM, METHOD, AND COMPUTER PROGRAM FOR AUTOMATICALLY REMEDIATING FALLOUTS IN AN ORDERING SYSTEM OF A CONSUMER TELECOMMUNICATIONS NETWORK

(71) Applicant: Amdocs Software Systems Limited, Dublin (IE)

(72) Inventors: Yoav Guez, Carmiel (IL); Yakov Eini, Modiin (IL); Tomer Sadan, Tel-Mond (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 14/254,754

(22) Filed: Apr. 16, 2014

Related U.S. Application Data (60) Provisional application No. 61/820,726, filed on May 8, 2013.

(51) Int. Cl.
    *G06Q 30/00*     (2012.01)
    *G06Q 30/06*     (2012.01)

(52) U.S. Cl.
    CPC ......... *G06Q 30/0635* (2013.01); *G06Q 30/06* (2013.01); *G06Q 30/0601* (2013.01); *G06Q 30/0637* (2013.01); *G06Q 30/0641* (2013.01)

(58) Field of Classification Search
    CPC .................................. G06Q 30/0601–30/0645
    USPC .......................... 714/100–800; 705/26.1–27.2
    See application file for complete search history.

(56) References Cited

U.S. PATENT DOCUMENTS

| 2002/0078208 A1* | 6/2002 | Crump | H04L 29/06 709/227 |
| 2003/0074463 A1* | 4/2003 | Swartz et al. | 709/230 |
| 2009/0164833 A1* | 6/2009 | Sebastian | 714/2 |

(Continued)

OTHER PUBLICATIONS

Khosrowpour, Mehdi. Dictionary of Information Science and Technology. "Application Program Interface (API)." Hershey, PA: IGI Global, 2007. eBook Collection (EBSCOhost). Web. Feb. 22, 2016.*

(Continued)

*Primary Examiner* — Jeffrey A. Smith
*Assistant Examiner* — Lindsey B Smith
(74) *Attorney, Agent, or Firm* — Zilka-Kotab, P.C.

(57) ABSTRACT

A system, method, and computer program product are provided for automatically remediating fallouts in an ordering system of a consumer telecommunications network. In use, one or more fallout errors are detected in one or more ordering systems associated with a consumer telecommunications network. Information associated with the one or more fallout errors is stored in a fallout error repository associated with the one or more ordering systems. Additionally, it is determined whether the one or more fallout errors are known fallout errors associated with one or more automatic processes for remediating the one or more fallout errors. Further, the one or more fallout errors are automatically remediated utilizing the one or more automatic processes for remediating the one or more fallout errors, in response to determining that the one or more fallout errors are known fallout errors associated with one or more automatic processes for remediating the one or more fallout errors.

9 Claims, 5 Drawing Sheets

(56) References Cited

U.S. PATENT DOCUMENTS

| | | | |
|---|---|---|---|
| 2011/0055834 A1* | 3/2011 | Meda | G06F 11/1402 718/101 |
| 2012/0303493 A1* | 11/2012 | Ishii | G06Q 30/06 705/28 |
| 2013/0103973 A1* | 4/2013 | Werth et al. | 714/2 |

OTHER PUBLICATIONS

"Order Fallout Management", 2013, Oracle® Communications Order and Service Management ConceptsRelease 7.2.2 captured on Sep. 15, 2013 at [https://web.archive.org/web/20130915091449/http://docs.oracle.com:80/] (Year: 2013).*

* cited by examiner

SYSTEM, METHOD, AND COMPUTER PROGRAM FOR AUTOMATICALLY REMEDIATING FALLOUTS IN AN ORDERING SYSTEM OF A CONSUMER TELECOMMUNICATIONS NETWORK

CLAIM OF PRIORITY

This application claims the benefit of U.S. Provisional Application No. 61/820,726, filed May 8, 2013, the entire contents of which are incorporated herein by reference.

FIELD OF THE INVENTION

The present invention relates to telecommunication industry service orders, and more particularly to ordering systems associated with such flow and activities.

BACKGROUND

Service providers (SPs) must execute business processes on time and provide efficient and cost-effective customer service. Market statistics and experience from actual accounts provide valuable information on real customer issues and needs, with regard to the operation area. Tier 1 and Tier 2 customers invest an enormous number of full time employees and significant operations resources into fallout management. Sustainable business service solutions and structured methodologies for resolving fallout issues reduces customer churn, enhances satisfaction, and improves customer experience.

Telecommunication service providers typically have complicated ordering systems that typically involve many systems and activities, ranging from order capture through service activation. There is thus a need for addressing these and/or other issues associated with the prior art.

SUMMARY

A system, method, and computer program product are provided for automatically remediating fallouts in an ordering system of a consumer telecommunications network. In use, one or more fallout errors are detected in one or more ordering systems associated with a consumer telecommunications network. Information associated with the one or more fallout errors is stored in a fallout error repository associated with the one or more ordering systems. Additionally, it is determined whether the one or more fallout errors are known fallout errors associated with one or more automatic processes for remediating the one or more fallout errors. Further, the one or more fallout errors are automatically remediated utilizing the one or more automatic processes for remediating the one or more fallout errors, in response to determining that the one or more fallout errors are known fallout errors associated with one or more automatic processes for remediating the one or more fallout errors.

DETAILED DESCRIPTION

Figure 1:
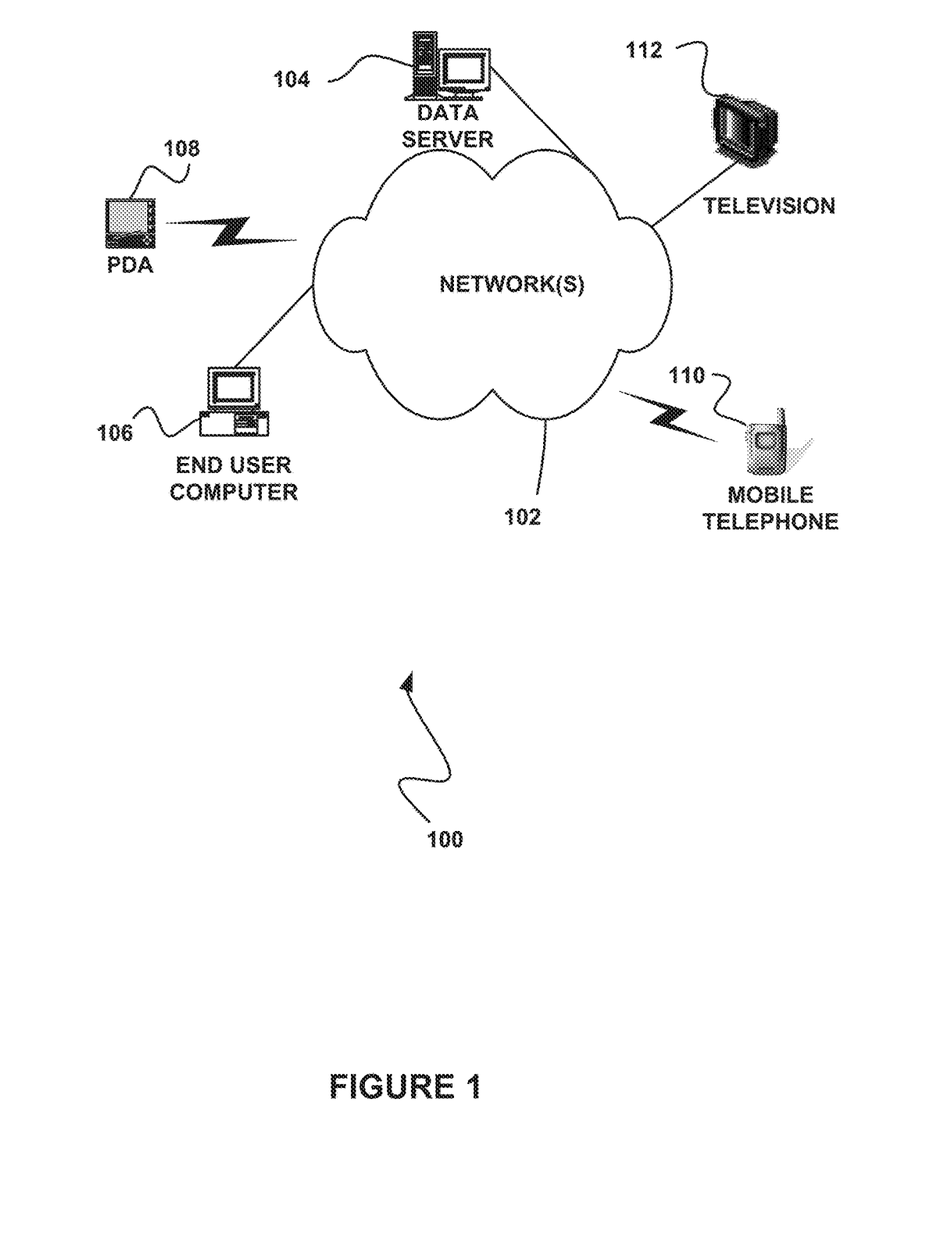
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
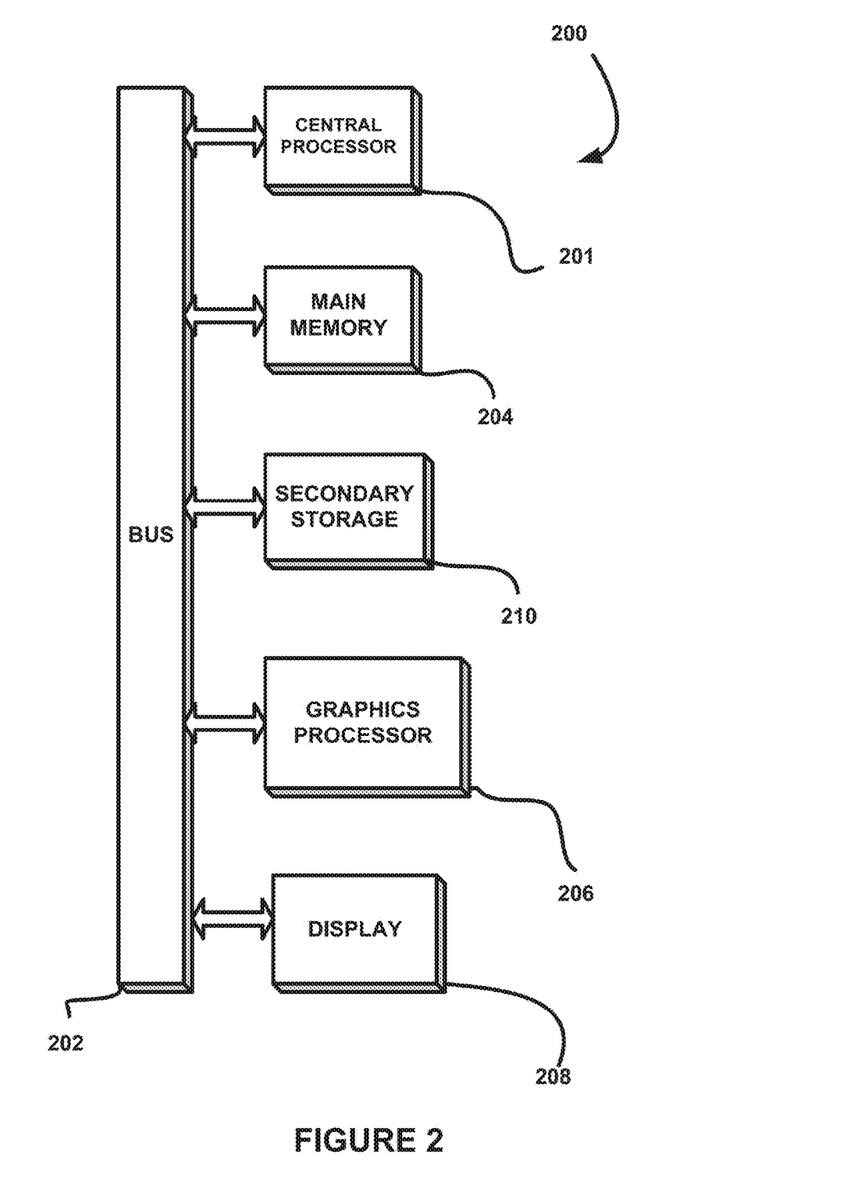
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
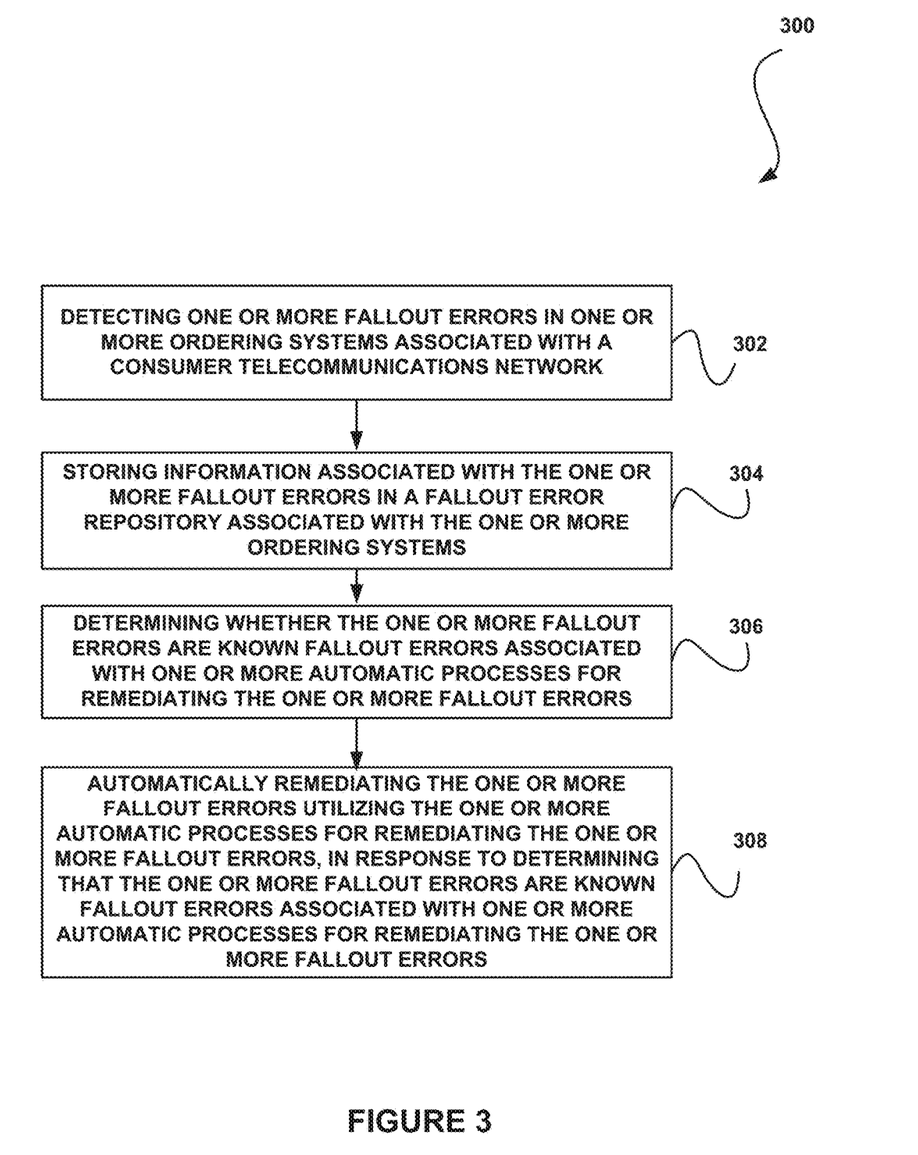
FIG. 3 illustrates a method for automatically remediating fallouts in an ordering system of a consumer telecommunications network, in accordance with one embodiment.

FIG. 3 illustrates a method 300 for automatically remediating fallouts in an ordering system of a consumer telecommunications network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, one or more fallout errors are detected in one or more ordering systems associated with a consumer telecommunications network. See operation 302. In the context of the present description, a fallout error refers to any error associated with an ordering system that prevents an order from being completed and/or activated.

The ordering system may include any ordering system associated with a service and/or product. For example, in one embodiment, the ordering system may include an ordering system associated with a consumer telecommunications network provider.

The fallout errors may be detected utilizing a variety of techniques. For example, the ordering system may be monitored to automatically detect the one or more fallout events associated with the ordering system. As an example, in one embodiment, one or more software agents may be utilized to monitor the ordering system to automatically detect the one or more fallout events.

As another example, a log file and/or an error file associated with the ordering system may be monitored to automatically detect the one or more fallout events. In another embodiment, one or more database tables associated with the ordering system may be monitored to automatically detect the one or more fallout events.

In another embodiment, periodic testing may be utilized to monitor the ordering system to automatically detect the one or more fallout events. In another embodiment, monitoring the ordering system may include invoking one or more APIs for querying information to automatically detect the one or more fallout events.

As shown further in FIG. 3, information associated with the one or more fallout errors is stored in a fallout error repository associated with the one or more ordering systems. See operation 304. The repository may include any memory and/or database, etc.

The repository of fallout errors may include various information, including information associated with a plurality of fallout errors. Fallout errors may include any information associated with a fallout.

Additionally, it is determined whether the one or more fallout errors are known fallout errors associated with one or more automatic processes for remediating the one or more fallout errors. See operation 306. In one embodiment, the known fallout error may include a fallout error that has occurred in the past. In this case, the fallout error repository may include an indication that the fallout error occurred in the past.

Further, the one or more fallout errors are automatically remediated utilizing the one or more automatic processes for remediating the one or more fallout errors, in response to determining that the one or more fallout errors are known fallout errors associated with one or more automatic processes for remediating the one or more fallout errors. See operation 308.

In one embodiment, the ordering systems may include or be associated with a plurality of ordering sub-systems. The sub-systems may include systems ranging from order capture initiation systems to service activation systems, etc.

In this case, in one embodiment, the one or more fallout errors may be detected in a first subset of the ordering sub-systems. Further, a second subset of the ordering sub-systems in which to remediate the one or more fallout errors may be identified. In this case, automatically remediating the fallout errors utilizing the one or more automatic processes may include utilizing the one or more automatic processes to remediate one or more errors associated with the second subset of ordering sub-systems. In other words, in one embodiment, the fallout errors may be detected in a first system and a second system may have to be fixed to remedy the errors.

In some cases, it may be determined that the one or more fallout errors are not known fallout errors. In this case, in response to determining that the one or more fallout errors are not known fallout errors associated with one or more automatic processes for remediating the fallout errors, the one or more fallout errors may be determined to be new.

Additionally, the fallout error repository may be updated with an indication that the one or more fallout errors will not be automatically remediated utilizing the automatic processes. Further, in one embodiment, an application programming interface (API) to a ticketing system may be triggered to generate a manual handling ticket associated with the one or more fallout errors.

On the other hand, in response to determining that the fallout errors are known fallout errors associated with the automatic processes for remediating the fallout errors, the fallout error repository may be updated with an indication that the fallout errors will be automatically remediated utilizing the automatic processes. Additionally, a security authentication may be received from one or more systems associated with a service provider of the consumer telecommunications network to automatically remediate the fallout errors utilizing the automatic processes for remediating the fallout errors.

Further, in one embodiment, the method 300 may include connecting to one or more systems associated with the ordering systems to automatically remediate the fallout errors utilizing the automatic processes for remediating the fallout errors. In this case, in one embodiment, connecting to the systems associated with the ordering systems may include invoking an application programming interface associated with the one or more systems.

Additionally, in one embodiment, automatically remediating the fallout errors utilizing the automatic processes for remediating the fallout errors may include updating a file and sending the file to the systems associated with the ordering systems. In another embodiment, automatically remediating the fallout errors utilizing the automatic processes for remediating the fallout errors may include updating a message and sending the message to the systems associated with the ordering systems. In yet another embodiment, automatically remediating the fallout errors utilizing the automatic processes for remediating the fallout errors may include updating a database associated with the systems.

The one or more automatic processes for remediating the fallout errors may include a variety of user defined or automatically defined processes. Furthermore, the automatic processes may include a single process or multiple processes.

As an example, the automatic processes for remediating the fallout errors may include performing screen scraping for gathering information and invoking actions. As another example, the automatic processes for remediating the fallout errors may include processes for reestablishing connections to one or more devices or applications (or testing such connections, etc.). As another example, the automatic processes for remediating the fallout errors may include processes for correcting an issue associated with at least one of a CPU, a memory, or a database.

Thus, the method 300 may be implemented to automatically resolve fallout cases in telecommunication service provider ordering systems, which may include order capture initiation to service activation, in order to reduce manual resolution efforts by enhancing the automation of fallout resolution. This may also include applying various techniques in order to improve service provider key performance indicators (KPIs).

For example, a flow through rate may be improved. The flow through rate is the percentage of orders completed from negotiation to activation without human intervention.

As another example, lead time may be improved. The lead time includes the elapsed time (e.g. in days, etc.) from setting an installation date with a customer until customer acceptance (as applicable).

As another example, an automation rate may be improved. The automation rate includes the percentage of fallout issues resolved by automated solutions.

Additionally, an order touch rate may be improved. The order touch rate includes the average number of manual operation touch points per order.

Further, meeting due dates may be improved. This includes the percentage of orders provisioned by a planned due date.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
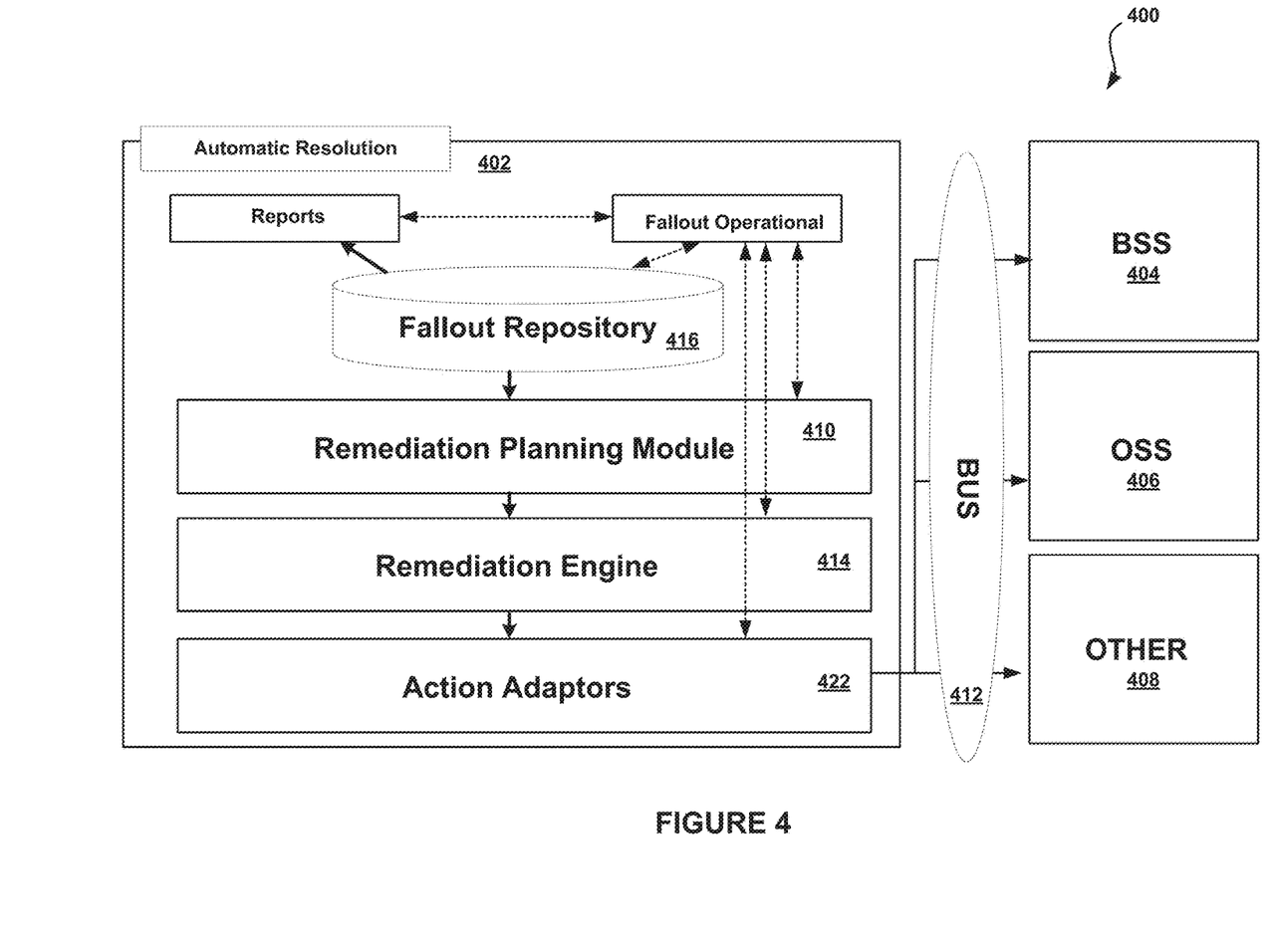
FIG. 4 illustrates an ordering system for automatically remediating fallouts in an ordering system of a consumer telecommunications network, in accordance with one embodiment.

FIG. 4 illustrates an ordering system 400 for automatically remediating fallouts in an ordering system of a consumer telecommunications network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the ordering system 400 includes an automatic resolution system 402, which is in communication with a BSS (Business Support Systems) 404, an OSS (Operation Support Systems) 406, and other service provider systems 408 for fixing the order fallout. A fallout repository 416 is also included. The fallout repository 416 stores fallout errors that have been detected in the ordering system 400 such as, for example, in the BSS systems 404 and/or the OSS systems 406.

The automatic resolution system 402 also includes a remediation planning module 410 operative to ascertain a suitable flow of remediation for each of the fallout errors stored in the repository 416. It is appreciated that each of the fallouts may comprise errors relating to a first subset of the ordering systems, and that the remediation of a fallout may require remediating errors in a second, different, subset of the ordering systems.

The automatic resolution system 402 may also include a remediation engine 414 operative to execute the flow of remediation planned by the remediation planning module 410. Additionally, the automatic resolution system 402 may include a plurality of action adaptors 422 operative to communicate and interface with the modules of the ordering system via a BUS communication interface 412.

In one embodiment, an automatic detection and filter module may monitor the ordering systems and identify fallouts using various technologies and resources, such as agents installed on the monitored systems. For example, automatic agents may function to monitor, in real time, transactions executed in the system 400 and proactively raise an event in case of a problem. This may be achieved, for example, by using byte code injection in java based systems.

In one embodiment, log files and error files may be utilized to monitor the system 400. For example, the log files and error files may contain information on problems that occur. The information in the files may be used in certain cases and systems to realize that there is a problem, and to provide sufficient information regarding the problem and context.

In another embodiment, database tables may be utilized to monitor the system 400. For example, the system 400 may log problems that occur in a database. In other situations, problem occurrences may be deduced from searching across one or more database tables for specific scenarios, even though no system has logged a clear indication in the database of a fallout occurrence.

In another embodiment, periodic testing may be utilized to monitor the system 400. For example, for problems such as connectivity, a periodic test may be performed and a failure may indicate a connectivity problem.

In another embodiment, an API invocation may be utilized to monitor the system 400. For example, in some cases, monitored systems may expose APIs for querying information on process statuses, or information that can assist in deducing that a certain fallout has occurred. In one embodiment, such APIs may be invoked, and the information gathered from them may lead to creation of fallout events.

In one embodiment, an events receiver may be included in the system 400 and may be operative to receive and analyze events received from the elements of the ordering system 400, and utilize the fallout repository 416 for storing the details of detected fallouts. In one embodiment, the fallouts may be displayed to an operator of the system 400 in the form of reports, and may also be forwarded to an operational department tasked with resolving the fallouts.

In one embodiment, the system 400 may function to collect fallout data from multiple resources that are part of a telecommunications service provider ordering system. The collection of data may be achieved by employing various technologies in a non-intrusive manner and issues may be addressed utilizing a suitable automated solution process.

This implementation functions to provide a centralized view of status of all current fallouts in a service provider ordering system, in which the status may be aggregated from multiple systems. This may be achieved by monitoring the end-to-end lifecycle of an order from the order capture through service activation in the network. Further, the detected fallouts may be automatically remedied.

Figure 5:
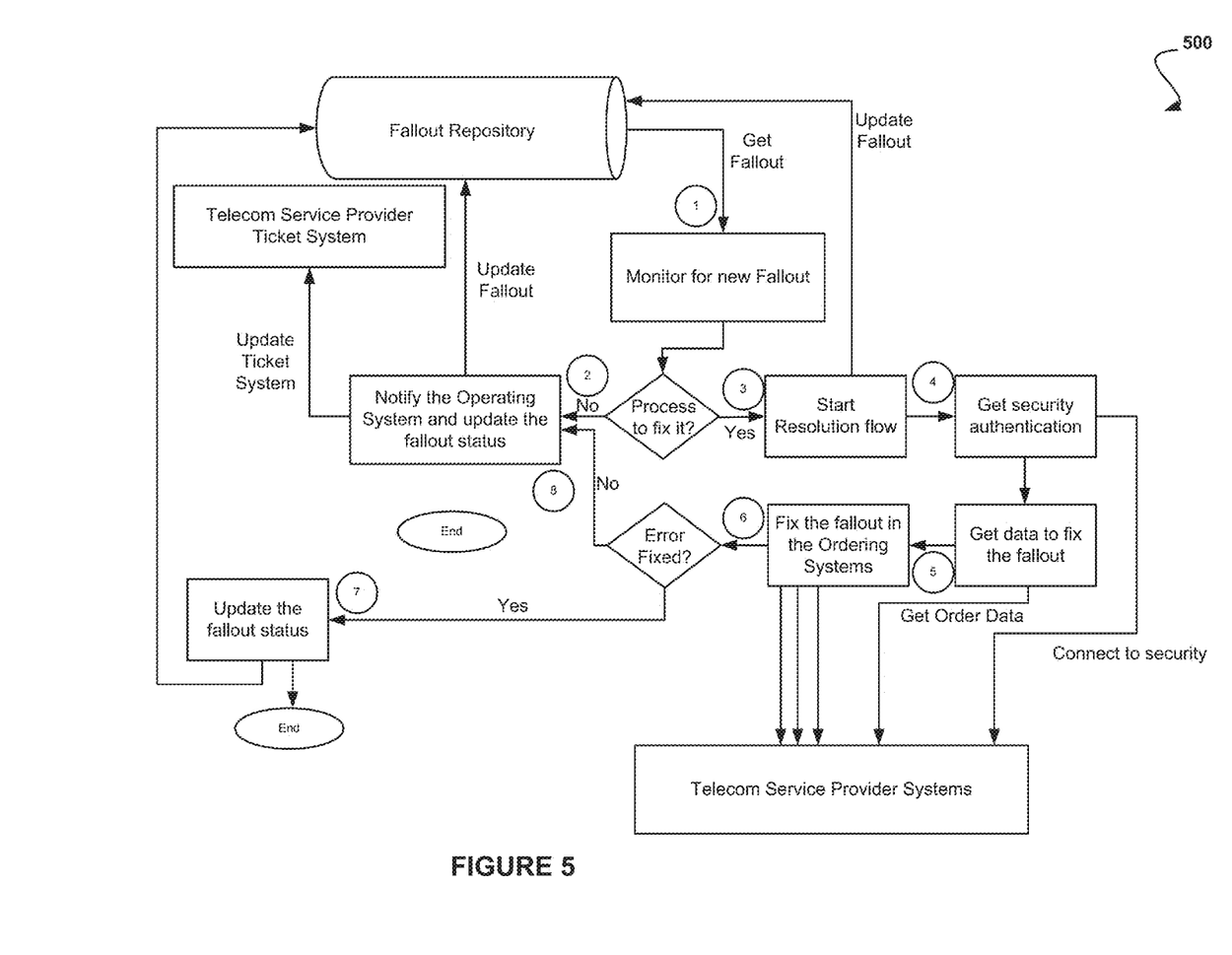
FIG. 5 illustrates a flow diagram for automatically remediating fallouts in the ordering system of FIG. 4, in accordance with one embodiment.

FIG. 5 illustrates a flow diagram 500 for automatically remediating fallouts in the ordering system of FIG. 4, in accordance with one embodiment. As an option, the flow diagram 500 may be implemented in the context of the details of FIGS. 1-4. Of course, however, the flow diagram 500 may be implemented in the context of any desired environment. Further, the aforementioned definitions may equally apply to the description below.

As shown in step 1 of FIG. 5, the process begins by monitoring the fallout repository 416 of FIG. 4 to identify a new fallout that the automatic resolution system 402 is to resolve. Initially, the system determines whether this fallout is due to a known error and if there is a predefined process for handling such fallout.

If the error is new, or if the current procedure is to handle this error manually, the system updates the fallout repository 416 indicating that this fallout will not be handled by the automatic resolution system 402. Further, an API to a ticketing system is triggered to open a manual handling ticket that may be handled by a back office team (see step 2 of FIG. 5).

In the case the fallout error is a known error and there is an automatic process to handle such error, as shown in step 3, the system first updates a fallout status of the error to indicate the fallout error is being handled by the automatic resolution system 402. The system continues, as shown in step 4, by receiving a security authentication from the service provider, which is typically necessary for connecting to systems to request data or to create changes.

In case the automatic resolution requires additional data in order to fix the fallout and this data is not in the fallout repository 402 (as shown in step 5 of FIG. 5), the system can connect to the ordering systems using APIs or database queries.

As shown in step 6, after capturing all the required data, the automatic resolution connects to one or more specific systems which need to be updated in order to fix the fallout. In various embodiments, this may include invoking an API of a system, updating a file/message and resending the file/message, and/or updating a database.

The system may then proceed to resolve the error by executing, for example, screen scraping for gathering information and invoking actions. In another case, the system may test and reestablish connections to devices and applications. As another example, the system may monitor and solve system issues such as, for example, issues associated with a CPU, disk space, processes, memory, queues and databases, etc.

The automatic resolution system 402 then determines whether the fallout was fixed and verifies the order process is continued using a loop that checks the order status every few seconds. If, as shown in step 8, after a predetermined duration the order did not continue along the regular process, the automatic resolution system 402 may update the fallout status of the error that the fallout was not fixed and trigger an API to the ticketing system to open a manual handling ticket that may be handled by a back office team. As shown in step 7 of FIG. 5, if the fallout was fixed, the fallout status may be updated to "complete" in the fallout repository.

In various embodiments, the system may include a monitoring capability operable for sending status reports of fallouts statuses and alarms in case there are significant changes in the fallout rate.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:

capturing, by one or more ordering systems associated with a consumer telecommunications network, orders for one or more services and activating the one or more services responsive to the orders;

detecting, by the one or more ordering systems, one or more fallout errors from information gathered from invoked application programming interfaces (APIs) of one or more monitored systems, the one or more fallout errors each preventing an associated order from being completed;

storing, by the one or more ordering systems in a fallout error repository associated with the one or more ordering systems, previously detected fallout errors and associated automatic processes previously utilized by the one or more ordering systems for remediating the one or more previously detected fallout errors;

determining, by the one or more ordering systems, whether the one or more fallout errors are included in the fallout error repository;

when an ordering system of the one or more ordering systems determine that a fallout error of the one or more fallout errors is not included in the fallout error repository:

updating, by the ordering system, the fallout error repository to include the fallout error and an indication that the fallout error will be resolved manually, and triggering, by the ordering system, an application programming interface (API) to a ticketing system to open a manual handling ticket for use by one or more users to manually resolve the fallout error; and when an ordering system of the one or more ordering systems determine that a fallout error of the one or more fallout errors is included in the fallout error repository:

updating, by the ordering system, a fallout status of the fallout error in the fallout error repository to indicate that the fallout error is being handled automatically, automatically remediating, by the ordering system, the fallout error utilizing the associated automatic process in the fallout error repository for remediating the fallout error, and confirming, by the ordering system, whether the fallout error was fixed by repeatedly checking a status of the order associated with the fallout error over a predetermined time period, when the ordering system confirms within the predetermined time period that the fallout error was fixed, updating by the ordering system the fallout status to indicate that the fallout error was fixed, and when the ordering system does not confirm within the predetermined time period that the fallout error was fixed, updating by the ordering system the fallout status to indicate that the fallout error was not fixed and triggering the API to the ticketing system to open the manual handling ticket for use by the one or more users to manually resolve the fallout error.

2. The computer program product of claim 1, wherein the computer program product is operable such that the one or more ordering systems includes a plurality of ordering sub-systems.

3. The computer program product of claim 2, wherein the computer program product is operable such that the one or more fallout errors are detected in a first subset of the plurality of ordering sub-systems.

4. The computer program product of claim 3, further comprising computer code for determining a second subset of the plurality of ordering sub-systems in which to remediate the one or more fallout errors.

5. The computer program product of claim 1, further comprising computer code for receiving a security authentication from one or more systems associated with a service provider of the consumer telecommunications network for use in the automatic remediation.

6. The computer program product of claim 1, wherein the computer program product is operable such that the automatic remediation includes performing screen scraping for gathering information and invoking actions.

7. The computer program product of claim 1, wherein the automatic remediation correcting an issue associated with the one or more of the hardware processor, the hardware memory, or the database.

8. A method, comprising:
capturing, by one or more ordering systems associated with a consumer telecommunications network, orders for one or more services and activating the one or more services responsive to the orders;
detecting, by the one or more ordering systems, one or more fallout errors from information gathered from invoked application programming interfaces (APIs) of one or more monitored systems, the one or more fallout errors each preventing an associated order from being completed;
storing, by the one or more ordering systems in a fallout error repository associated with the one or more ordering systems, previously detected fallout errors and associated automatic processes previously utilized by the one or more ordering systems for remediating the one or more previously detected fallout errors;
determining, by the one or more ordering systems, whether the one or more fallout errors are included in the fallout error repository;
when an ordering system of the one or more ordering systems determine that a fallout error of the one or more fallout errors is not included in the fallout error repository:
updating, by the ordering system, the fallout error repository to include the fallout error and an indication that the fallout error will be resolved manually, and
triggering, by the ordering system, an application programming interface (API) to a ticketing system to open a manual handling ticket for use by one or more users to manually resolve the fallout error; and
when an ordering system of the one or more ordering systems determine that a fallout error of the one or more fallout errors is included in the fallout error repository:
updating, by the ordering system, a fallout status of the fallout error in the fallout error repository to indicate that the fallout error is being handled automatically,
automatically remediating, by the ordering system, the fallout error utilizing the associated automatic process in the fallout error repository for remediating the fallout error, and
confirming, by the ordering system, whether the fallout error was fixed by repeatedly checking a status of the order associated with the fallout error over a predetermined time period,
when the ordering system confirms within the predetermined time period that the fallout error was fixed, updating by the ordering system the fallout status to indicate that the fallout error was fixed, and
when the ordering system does not confirm within the predetermined time period that the fallout error was fixed, updating by the ordering system the fallout status to indicate that the fallout error was not fixed and triggering the API to the ticketing system to open the manual handling ticket for use by the one or more users to manually resolve the fallout error.

9. A system comprising:
a memory system in one or more ordering systems; and
one or more processing cores in the one or more ordering systems and coupled to the memory system and that are each configured for:
capturing, by one or more ordering systems associated with a consumer telecommunications network, orders for one or more services and activating the one or more services responsive to the orders;
detecting, by the one or more ordering systems, one or more fallout errors from information gathered from invoked application programming interfaces (APIs) of one or more monitored systems, the one or more fallout errors each preventing an associated order from being completed;
storing, by the one or more ordering systems in a fallout error repository associated with the one or more ordering systems, previously detected fallout errors and associated automatic processes previously utilized by the one or more ordering systems for remediating the one or more previously detected fallout errors;
determining, by the one or more ordering systems, whether the one or more fallout errors are included in the fallout error repository;
when an ordering system of the one or more ordering systems determine that a fallout error of the one or more fallout errors is not included in the fallout error repository:
updating, by the ordering system, the fallout error repository to include the fallout error and an indication that the fallout error will be resolved manually, and
triggering, by the ordering system, an application programming interface (API) to a ticketing system to open a manual handling ticket for use by one or more users to manually resolve the fallout error; and
when an ordering system of the one or more ordering systems determine that a fallout error of the one or more fallout errors is included in the fallout error repository:
updating, by the ordering system, a fallout status of the fallout error in the fallout error repository to indicate that the fallout error is being handled automatically,
automatically remediating, by the ordering system, the fallout error utilizing the associated automatic process in the fallout error repository for remediating the fallout error, and
confirming, by the ordering system, whether the fallout error was fixed by repeatedly checking a status of the order associated with the fallout error over a predetermined time period,
when the ordering system confirms within the predetermined time period that the fallout error was fixed, updating by the ordering system the fallout status to indicate that the fallout error was fixed, and
when the ordering system does not confirm within the predetermined time period that the fallout error was fixed, updating by the ordering system the fallout status to indicate that the fallout error was not fixed and triggering the API to the ticketing system to open the manual handling ticket for use by the one or more users to manually resolve the fallout error.

* * * * *